Patented Apr. 27, 1926.

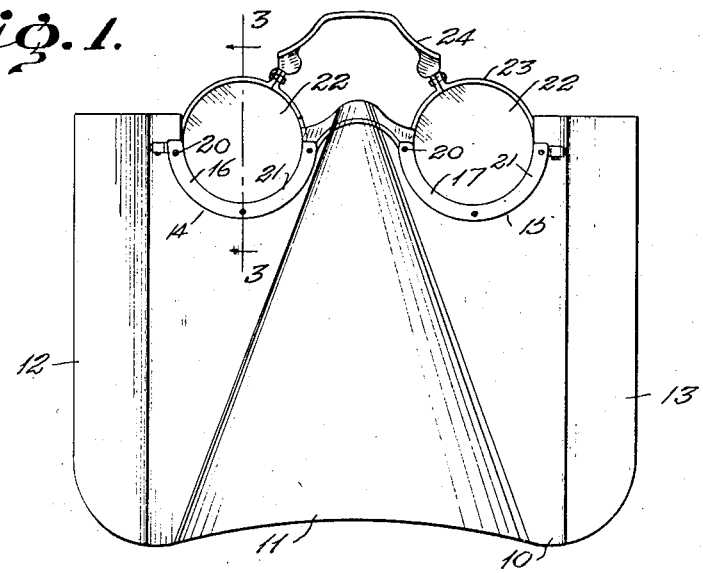
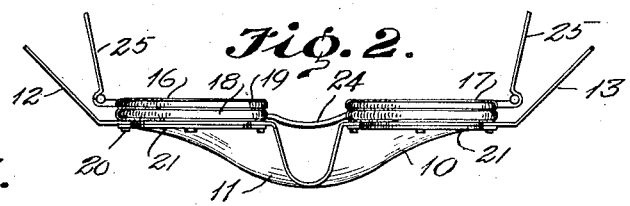
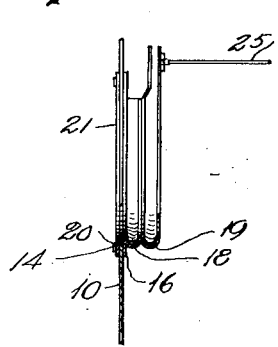
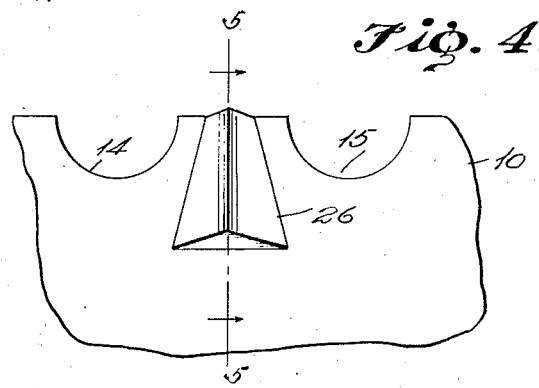
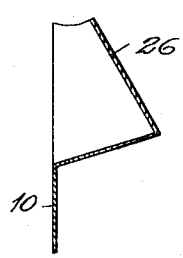

1,582,164

UNITED STATES PATENT OFFICE.

SAMUEL L. BURSTYN, OF AUSTIN, TEXAS.

FACE PROTECTOR OR SHIELD.

Application filed September 8, 1923. Serial No. 661,603.

*To all whom it may concern:*

Be it known that I, SAMUEL L. BURSTYN, a citizen of the United States of America, and resident of Austin, in the county of Travis and State of Texas, have invented certain new and useful Improvements in Face Protectors or Shields, of which the following is a specification.

This invention relates to face protectors or shields, and is intended for use more particularly by professional men such as surgeons, doctors, dentists and the like, to protect the face and eyes of the operator while performing those operations in which the patient is prone to eject injurious or damaging secretions or germs which would affect the operator's health, or interrupt the progress of the operation, due to the fouling of the operator's eyes or face.

It is an object of the invention to provide a shield which will protect the face and eyes of an operator, as has been stated, while at the same time affording means for changing the lenses through which the operator may observe progress of the operation, should the said lenses become fouled; and it is furthermore an object to produce a device in which lenses of different focal values or plano may be employed or made interchangeable, and in which the adjustment or substitution can be made while the shield is being worn; making it possible for an attendant to remove fouled or dirty glasses and substitute others to clear the operator's vision.

It is a further object of this invention to produce a shield for the face and shielding lenses for the eyes of an operator, in which two sets of lenses may be employed for each eye, and therefore, provision is made for accommodating two lenses through the use of two seats or curved grooves in each cell of a frame, which frame is associated with the shield.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a front view of the shield embodying the invention;

Figure 2 illustrates a top plan view thereof;

Figure 3 illustrates a sectional view on the line 3—3 of Fig. 1 with the lenses omitted;

Figure 4 illustrates a view in elevation of a fragment of the shield with the lens frame omitted; and Figure 5 illustrates a sectional view on the line 5—5 of Fig. 4.

In these drawings, 10 denotes the face shield, which is preferably formed of celluloid or the like, with an outwardly curved central portion 11 forming a clearance which will permit the free breathing of the operator; the said shield having rearwardly extending wings 12 and 13 at the sides in order that the shield will cover practically the whole area of the face of the wearer.

The upper edge of the shield is provided with two recesses 14 and 15 constituting clearances for vision. The recesses 14 and 15 are occupied by semi-circular frames 16 and 17 respectively, each having two grooves or seats 18 and 19 in which lenses or lens frames may rest; the said lenses constituting shields for the eyes of the operator and means for providing proper focus, since the lenses may be plain or ground, according to the requirements of the eyes of the operator.

The frames 16 and 17 are preferably held against the inner surface of the shield by fastenings 20, such as screws, that pass through curved plates 21 that are forced against the outer surface of the shield by the action of the fastenings. In other words, the fastenings serve to clamp the edges of the shield between the frame sections and the said plates for the purpose of retaining the parts in assembled relation.

In the present embodiment of the invention, the lenses 22 are preferably applied to a frame 23, which includes a rigid bar 24, which bar the operator may grasp for the purpose of changing the set of glasses or lenses when the glasses or lenses are to be removed and other sets are to be substituted. It will thus be seen that pairs of lenses may be held, one pair back of the other, and that the lenses may be removable when occasion requires, but the inventor does not wish to be limited with respect to the type of lenses employed, since they may be provided to suit particular requirements.

The lens-holding frame is preferably provided with temples or bows 25 that may extend back of the ears of the user, to insure the holding of the shield against accidental displacement, or other means may be employed for securing the shield in position.

Instead of having the shield outwardly curved, it could be shaped to produce a nose cavity 26 such as is illustrated in Figs. 4 and 5, and when made in this configuration, the nose cavity will be made relatively large in order that it may be used by different persons.

It is believed that one skilled in the art will understand the invention from the foregoing description, and it is to be understood that changes may be made in the details of construction, proportions and configurations of the invention without departing from the spirit of the following claims.

I claim—

1. In a sanitary face shield, a body having a configuration to provide a nasal clearance and recesses in its upper edge, one on each side of the nasal clearance, and a frame fitted to each recess and having seats, one back of the other for the reception of lenses, the said frame and seats being open at the top to permit the insertion and removal of the lenses from above.

2. In a sanitary face shield, a body having a configuration to provide a nasal clearance and recesses in its upper edge, one on each side of the nasal clearance, a frame fitted to each recess and having seats, one back of the other for the reception of lenses, the said frame and seats being open at the top to permit the insertion and removal of the lenses from above, lenses located in the rear recesses of the seats, removable lenses in the front seats, and means for connecting the removable lenses whereby they may be manipulated together.

SAMUEL L. BURSTYN.